June 4, 1929.  B. PASQUARELLI ET AL  1,715,673
SIGNALING DEVICE
Filed Feb. 9, 1928   3 Sheets-Sheet 1
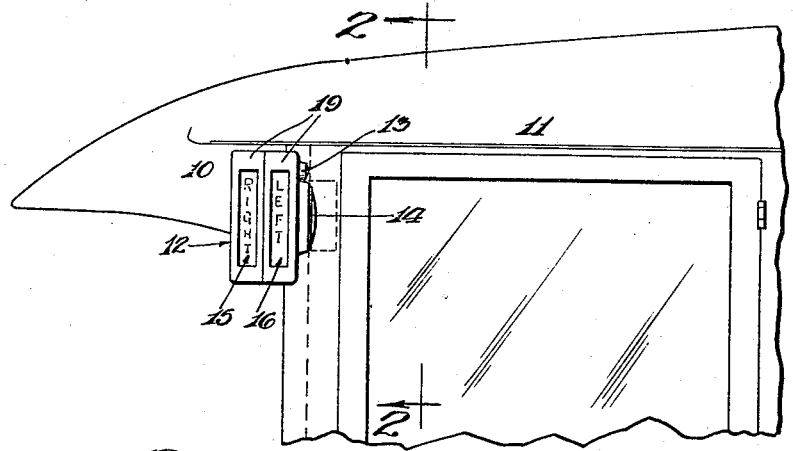
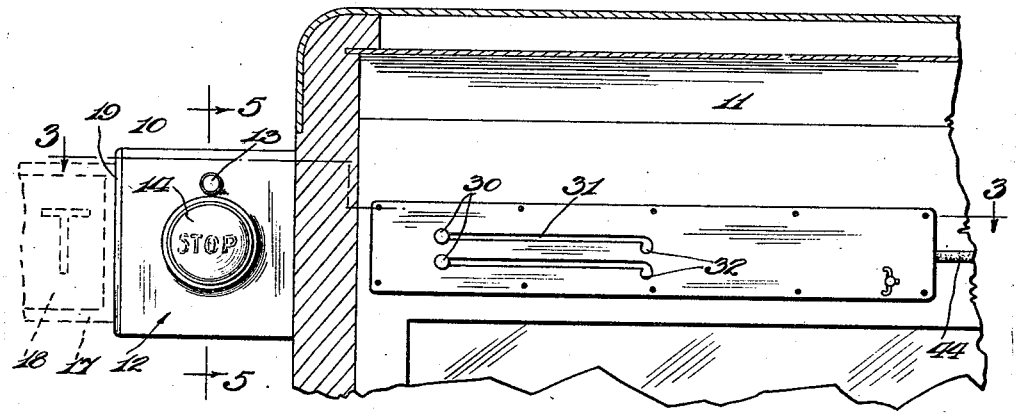
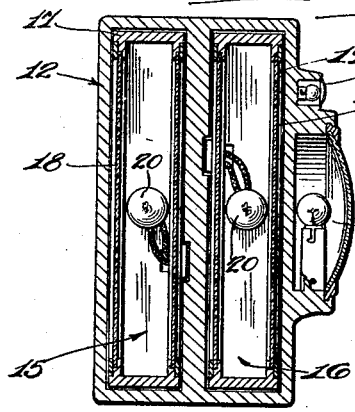
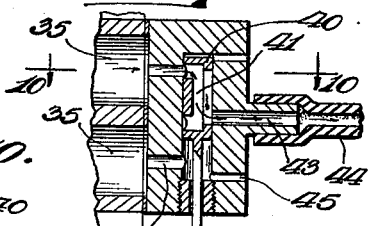
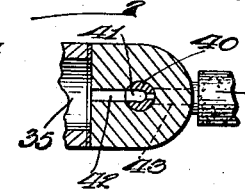

June 4, 1929.  B. PASQUARELLI ET AL  1,715,673
SIGNALING DEVICE
Filed Feb. 9, 1928    3 Sheets-Sheet 2
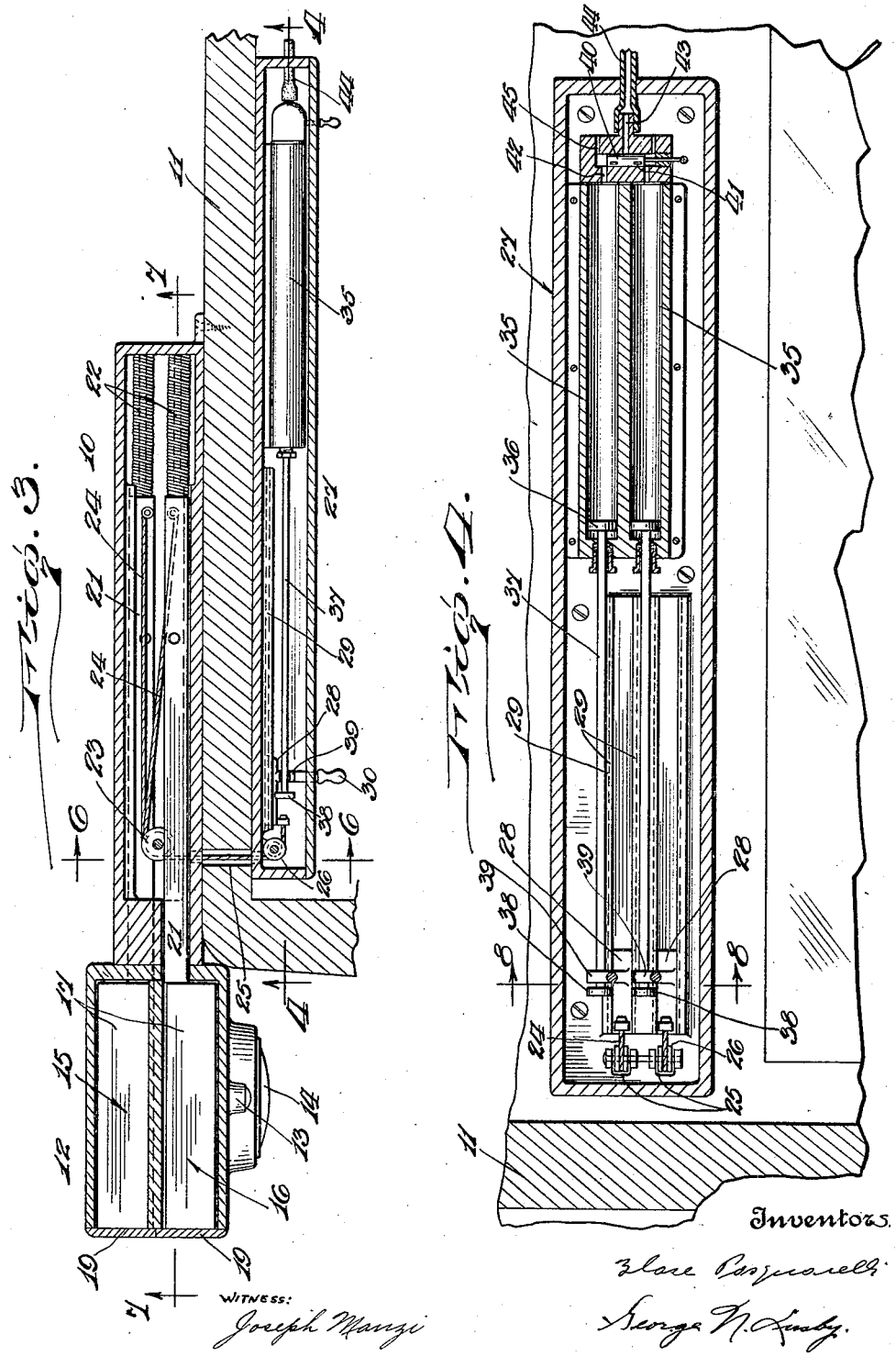

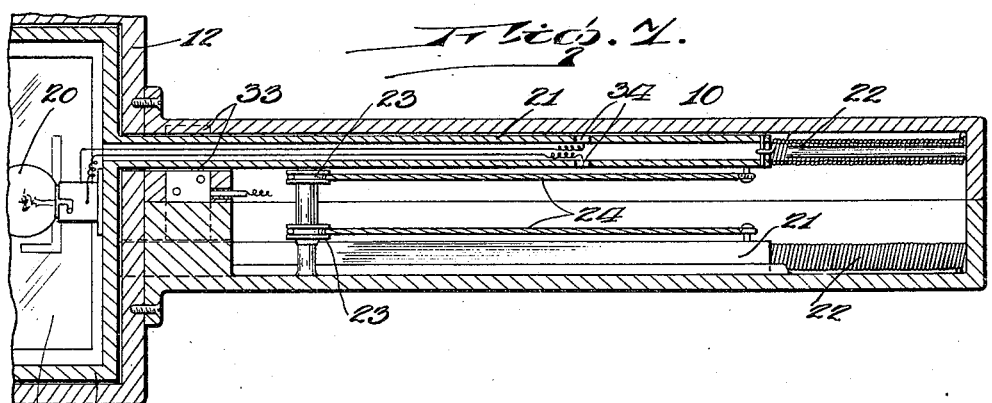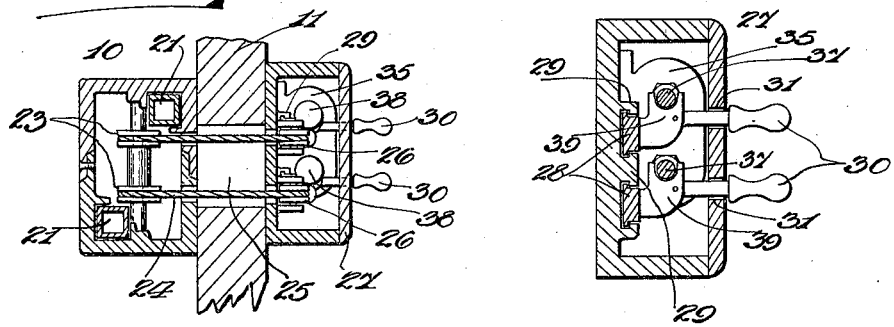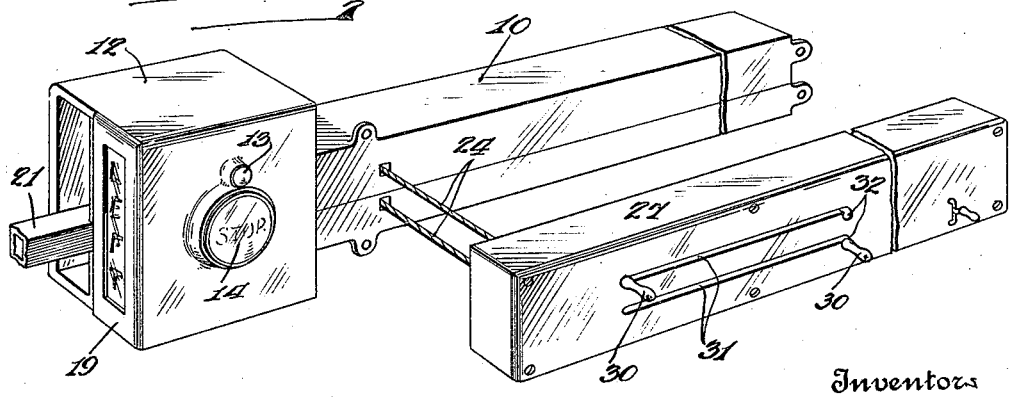

Patented June 4, 1929.

1,715,673

UNITED STATES PATENT OFFICE.

BLASE PASQUARELLI, OF BRONX, NEW YORK, AND GEORGE N. LUSBY, OF SOUTH AMBOY, NEW JERSEY; SAID LUSBY ASSIGNOR TO SAID PASQUARELLI.

SIGNALING DEVICE.

Applicaiton filed February 9, 1928. Serial No. 253,166.

This invention relates to improvements in directional signaling devices and has particular reference to a directional indicator for motor vehicles.

The primary object of the invention resides in a signaling device for use primarily on "closed" automobiles in which it is impossible for the driver of a car to signal by hand to the driver of an approaching car of his intention to turn especially in inclement and cold weather when driving with the windows closed. The main object of this invention is therefore, to provide a simple and effective signaling device to indicate the intention of a driver to turn either to the right or left.

Another object of the invention is the provision of a signaling apparatus for visually indicating right and left turn of a motor vehicle and which may be conveniently operated for selectively operating the signals by the driver reaching forward and imparting a sliding movement to an actuating knob, or by mounting a control valve within reach of the driver should it be desired to operatively connect the signaling apparatus with the intake manifold of the motor to operate the same by suction. The apparatus is adaptable for either use.

Another object of the invention is the provision of a signaling apparatus in which the signal members are movable from a normally concealed position to a prominent display position beyond one of the sides of the vehicle on which it is mounted whereby the movement of the selected signal member to a display position will attract the attention of those persons thereabout and forewarn them the driver's intention to make either a right or left turn.

A further object is to provide a signaling apparatus which is simple of construction, easy of operation, and unlikely to become out of order when subjected to the elements and to the ordinary vibrations of the automobile in which it is to be mounted.

In the drawings:—

Figure 1 is a fragmentary side elevational view of an automobile with my improved directional indicator in position thereon.

Figure 2 is a vertical transverse sectional view on the line 2—2 of Figure 1.

Figure 3 is a horizontal sectional view on the line 3—3 of Figure 2.

Figure 4 is a vertical longitudinal sectional view on the line 4—4 of Figure 3.

Figure 5 is a vertical transverse sectional view on the line 5—5 of Figure 2.

Figure 6 is a vertical transverse sectional view on the line 6—6 of Figure 3.

Figure 7 is a vertical longitudinal sectional view on the line 7—7 of Figure 3.

Figure 8 is a vertical transverse sectional view on the line 8—8 of Figure 4.

Figure 9 is an enlarged detail horizontal sectional view through control valves for the suction operated means.

Figure 10 is a detail sectional view on the line 10—10 of Figure 9.

Figure 11 is a perspective view of the signal apparatus per se.

Referring to the drawing by reference characters, the numeral 10 designates a signal housing which is mounted exteriorly upon a motor vehicle 11 at a point above the windshield and at the left side thereof, so that the enlarged head 12 of the housing projects beyond the side of the vehicle. The rear of the housing head 12 has a small parking light 13, and a stop light 14 built therein. The stop light 14 is connected up with the brake pedal and wired in the usual manner.

Slidably mounted within the housing 10 are right and left signal members 15 and 16, both of which are identical in construction with the exception that they contain separate and distinct signaling indicia. The signal members are mounted side by side and each includes a casing 17 having translucent panels 18 mounted in the opposite side walls and which contains the signaling indicia "right" or "left". The outer end of the housing head 12 is open for the extension of the signal casings therebeyond while the outer end walls of the signal casings carry plates 19 which co-act with the side walls of the housing head to close the open side thereof when the signal members are in a retracted position. An electric light bulb 20 is mounted in each signal casing for lighting up the casing when the signal member is moved to a signaling position.

Extending inwardly from each signal casing is a tubular rod 21 which is square in cross section and is slidably mounted within the housing 10. A contractile spring 22 has one of its ends fixedly connected to the free end of said rod and its other end secured to the end wall of said housing for normally holding the signal member in a retracted position.

Rollers 23 are journalled within the housing for the passage of cables 24 which have one of their ends fixedly connected to the inner ends of the tubular rods 21 while the other ends of the cables pass through a slot 25 in the windshield and over pulleys 26 journalled in a casing 27 supported above the windshield on the inside thereof. The free ends of the cables are respectively connected to carriages 28, slidably mounted in tracks 29 provided within the casing 27. The carriages 28 have pivoted manipulating knobs 30 extending through elongated slots 31 in the outer side wall of the casing 27, the right ends of the slots terminating in offset notches 32 adapted to receive the knobs 30 when moved to the limit of their movement toward the right to actuate the signal members and when the knobs are seated in the notches, the signal members are held in a signaling position against the action of the springs 22.

The operation of the signaling apparatus from the description, thus far is as follows. The operator of the motor vehicle when contemplating a right or left turn, reaches forward and grasps one of the actuating knobs 30, depending upon whether he desires to extend the right signal member 15 or the left signal member 16. He then pushes the selected knob toward the right until the same seats in its respective offset notch 32 where it remains until manually released therefrom. During the movement of the knob 30 from one end of the slot 31 to the other, the carriage to which the knob is fastened moves on its track and pulls upon the cable 24 which shortens the lead of the cable within the housing 10 and lengthens the lead disposed within the casing 27. The shortening of the lead in the housing causes the selected signal member 15 or 16 to move through the open end of the housing head to an exposed position whereupon the electric light bulb 20 automatically lights up by the closing of an electric circuit which will presently be explained. It will be understood that the selected signal member has been moved to a signaling position against the action of its spring 22 which places the signal member under tension. After the vehicle has made the desired turn, the operator merely unseats the knob from its recess 32 whereupon the tensioned spring returns the signal member to its normal position within the housing head and the knob 30 moves to the limit of its movement to the left, thus causing all the parts to return to their original positions.

For the purpose of lighting the electric bulbs 20 to illuminate the respective signals upon their limit of movement to indicating position, I provide stationary contacts 33 within the housing 10 and which are arranged in an electric circuit with contacts 34 carried by the respective signal members and which engage the contacts 33 when the selected signal member reaches the limit of its extended movement, to close the circuit in which the bulbs are arranged.

It may be desirous to operate the signal members by vacuum in lieu of by the knobs 30, in which case, I provide separate cylinders 35 within the inner casing 27 in which pistons 37 are slidably mounted. The piston rods 37 extend through one of the end walls of the cylinders parallel to the movement of carriages 28 and which have heads 38 provided on the free ends thereof disposed in the path of yokes 39 extending from the carriages. The heads are adapted to engage the yokes upon movement of the pistons in one direction by the vacuum set up within the respective cylinders controlled by a turnable and slidable plug 40 having a U-shaped port 41 for selective registry with either of the ports 42 entering the cylinders 35. A passage 43 constantly communicates with the port 41 and passes through a nipple to which one end of a hose 44 is connected, while the other end of the hose is adapted to be tapped into the intake manifold of an internal combustion engine for utilizing the suction present therein for operating the selected signal by moving the valve plug 40 into position as to cause the port 41 to register with one of the passages 42. This establishes direct communication between the cylinder and the vacuum hose 44, to cause the piston to move backward and accordingly actuate the carriage to move the respective signal member to a display position as hereinbefore mentioned. To break the vacuum within the cylinders, I provide bleed openings 45 in the valve casing which establishes communication between the atmosphere and the cylinders when the valve has been moved from an "on" to an "off" position. The valve plug 40 may be operatively connected by any suitable means to a control lever adapted to be arranged within reach of the operator of a motor vehicle on which the signal is mounted.

What is claimed as new is:—

1. A direction signal for motor vehicles comprising a housing adapted to be mounted exteriorly of the body of an automobile, a signal member slidably mounted in said housing, a spring tending to normally hold said signal member in a concealed position within said housing, a second housing adapted to be mounted on the interior of an automobile, a carriage slidably mounted therein, a cable having its ends respectively connected to said signal member and carriage, said second housing having an elongated slot provided therein, a pivoted manipulating handle extending from said slide through said slot, and an offset portion provided at one end of said slot for receiving and holding said manipulating handle upon movement of the same thereinto against the action of said spring, substantially as and for the purpose specified.

2. A direction signal for motor vehicles comprising a housing adapted to be mounted exteriorly of the body of an automobile having an enlarged open head at one end thereof, a signal member embodying an elongated rod slidably and non-rotatably mounted in said housing and provided with a signal head on the outer end thereof, a contractile spring within said housing for normally holding said signal member in a retracted position with its signal head concealed within said open housing head, a second housing adapted to be mounted interiorly of the body of an automobile having an elongated slot therein provided with an offset notch at one end thereof, a slide member within said second housing, a pivoted manipulating handle mounted on said slide and extending through said slot, a cable having its ends respectively connected to said signal member and said slide member, and pulleys over which said cable passes, substantially as and for the purpose specified.

In testimony whereof, we hereby affix our signatures.

BLASE PASQUARELLI.
GEORGE N. LUSBY.